(12) United States Patent
Hedlund

(10) Patent No.: US 11,981,205 B2
(45) Date of Patent: May 14, 2024

(54) IN-VEHICLE PHONE FINDER

(71) Applicant: Jason C Hedlund, West Bloomfield, MI (US)

(72) Inventor: Jason C Hedlund, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 421 days.

(21) Appl. No.: 17/330,574

(22) Filed: May 26, 2021

(65) Prior Publication Data
US 2022/0379725 A1 Dec. 1, 2022

(51) Int. Cl.
| | |
|---|---|
| *B60K 35/00* | (2006.01) |
| *B60K 35/80* | (2024.01) |
| *B60K 35/85* | (2024.01) |
| *G01S 13/46* | (2006.01) |
| *H04W 4/029* | (2018.01) |
| *H04W 4/48* | (2018.01) |
| *H04W 4/80* | (2018.01) |
| *H04W 12/50* | (2021.01) |

(52) U.S. Cl.
CPC .............. *B60K 35/00* (2013.01); *G01S 13/46* (2013.01); *H04W 4/029* (2018.02); *H04W 4/48* (2018.02); *H04W 4/80* (2018.02); *H04W 12/50* (2021.01); *B60K 35/80* (2024.01); *B60K 35/85* (2024.01); *B60K 2360/563* (2024.01); *B60K 2360/589* (2024.01); *G01S 2013/468* (2013.01)

(58) Field of Classification Search
CPC .............. B60K 35/00; B60K 2370/563; B60K 2370/589; B60K 2370/152; B60K 2370/48; B60K 2370/56; G01S 13/46; G01S 2013/468; G01S 13/87; G01S 13/765; H04W 4/029; H04W 4/48; H04W 4/80; H04W 12/50
See application file for complete search history.

(56) References Cited

U.S. PATENT DOCUMENTS

| | | | |
|---|---|---|---|
| 9,258,715 B2 | 2/2016 | Borghei | |
| 9,297,882 B1* | 3/2016 | Bhatia | ............... H04W 4/029 |
| 10,102,734 B2 | 10/2018 | Kumar et al. | |
| 11,345,415 B2* | 5/2022 | Funyak | ............... G01S 13/878 |
| 11,697,372 B1* | 7/2023 | Hubbell | ............... G08G 1/163 |
| | | | 701/1 |
| 2011/0070898 A1 | 3/2011 | Sanjeev et al. | |
| 2014/0099973 A1 | 4/2014 | Cecchini et al. | |

(Continued)

FOREIGN PATENT DOCUMENTS

| | | |
|---|---|---|
| CN | 106385666 A | 2/2017 |
| JP | 4877562 B2 | 2/2012 |

(Continued)

*Primary Examiner* — Yonel Beaulieu
(74) *Attorney, Agent, or Firm* — Jeremy J. Klobucar

(57) ABSTRACT

A system and method for locating a portable electronic device that is paired with a vehicle that uses a plurality of antennas located on an exterior of a body of the vehicle, within an interior cabin of the vehicle, or located on the exterior of the body and within the interior cabin of the vehicle to communicate with the portable electronic device, and displays a location of the portable electronic device within or near the vehicle based on the communication between the plurality of antennas and the portable electronic device on a graphic display interface of the vehicle.

16 Claims, 3 Drawing Sheets

(56) References Cited

U.S. PATENT DOCUMENTS

2016/0295365 A1* 10/2016 Allen ................ G01S 19/42
2017/0221341 A1* 8/2017 Pai .................... H04W 4/80
2020/0249822 A1* 8/2020 Penilla .............. G07C 5/008

FOREIGN PATENT DOCUMENTS

| WO | WO-2017118919 A1 * | 7/2017 | ............. A45C 13/10 |
| WO | WO-2021262899 A1 * | 12/2021 | ............. H04L 67/18 |
| WO | WO-2022256445 A1 * | 12/2022 | ............. H04W 12/50 |

* cited by examiner

IN-VEHICLE PHONE FINDER

FIELD

The present disclosure relates to an in-vehicle phone finder.

BACKGROUND

There are various methods and applications that assist in finding a lost electronic device, such as a mobile phone. Some methods include logging into a specific application that causes the lost device to emit an audible cue (e.g., an audible beep) or a visible cue (e.g., a flashing light) until the lost device is located. Other methods may use a separate electronic device that communicates with the electronic device via a communication interface such as Bluetooth, which causes the lost device to also emit audible or visible cues when prompted by the separate device. In each of these methods, however, the owner of the lost device must use a service or device to locate the lost device. This is undesirable from the standpoint that the owner of the lost device may not have the ability to log into the specific application to locate the lost device due to not being near another device such as a computer or other electronic device that enables the owner to access the application, or the owner of the lost device does not have access to the separate electronic device that communicates with the lost device via the communication interface. As a result, the owner of the lost device may be forced to leave the area where the device was lost to obtain a device that may be used to find the lost device, which enables someone else to possibly find the device before the owner.

SUMMARY

According to a first aspect of the present disclosure, there is provided a vehicle that includes a vehicle body including an exterior, and including an interior cabin; a graphic display interface positioned within the interior cabin, the graphic display interface configured to be paired to a portable electronic device; and a plurality of antennas located on the exterior of the vehicle body, within the interior cabin, or located on the exterior of the vehicle body and within the interior cabin, wherein the plurality of antennas are each configured to communicate with at least the graphic display interface and the portable electronic device when the portable electronic device is paired with the graphic display interface, communication between the paired portable electronic device and at least one of the plurality of antennas determines a location of the paired portable electronic device either near the exterior of the vehicle or within the interior cabin, and wherein the graphic display interface is configured to display the location of the paired portable electronic device based on the communication between the paired portable electronic device and the at least one of the plurality of antennas.

According to the first aspect, the graphic display interface includes at least one of a controller and memory for storing data associated with locations of each of the antennas and distances between each of the antennas.

According to the first aspect, the graphic display interface includes the controller, and the controller is configured to determine the location of the portable electronic device based on a combination of the data and the communication between the paired portable electronic device and the at least one of the plurality of antennas.

According to the first aspect, a distance between the portable electronic device and each of the antennas is based on a signal strength or time of flight of the communication between the portable electronic device and each of the antennas.

According to the first aspect, the distances between each of the antennas and the portable electronic device is used by the controller to determine the location of the portable electronic device.

According to the first aspect, the exterior of the vehicle includes vehicle doors, a hood, wheel wells, and a rear storage compartment, and the antennas located on the exterior of the vehicle are located on at least one of these components.

According to the first aspect, the interior cabin includes a front seating area, a rear seating area, and a storage compartment between seats of the front seat area, and the antennas located within the interior cabin are located proximate each of these components.

According to the first aspect, each of the antennas are configured to communicate with the paired electronic device when prompted by the graphic display interface.

According to a second aspect of the present disclosure, there is provided a method for locating a portable electronic device that is paired with a vehicle, which includes using a plurality of antennas located on an exterior of a body of the vehicle, within an interior cabin of the vehicle, or located on the exterior of the body and within the interior cabin of the vehicle to communicate with the portable electronic device; and displaying a location of the portable electronic device within or near the vehicle based on the communication between the plurality of antennas and the portable electronic device on a graphic display interface of the vehicle.

According to the second aspect, the graphic display interface includes at least one of a controller and memory for storing data associated with locations of each of the antennas and distances between each of the antennas.

According to the second aspect, the graphic display interface includes the controller, and the controller is configured to determine the location of the portable electronic device based on a combination of the data and the communication between the portable electronic device and at least one of the plurality of antennas.

According to the second aspect, a distance between the portable electronic device and each of the antennas is based on a signal strength or time of flight of the communication between the portable electronic device and each of the antennas.

According to the second aspect, the distances between each of the antennas and the portable electronic device is used by the controller to determine the location of the portable electronic device.

According to the second aspect, the exterior of the vehicle includes vehicle doors, a hood, wheel wells, and a rear storage compartment, and the antennas located on the exterior of the vehicle are located on at least one of these components.

According to the second aspect, the interior cabin includes a front seating area, a rear seating area, and a storage compartment between seats of the front seat area, and the antennas located within the interior cabin are located proximate each of these components.

According to the second aspect, the each of the antennas are configured to communicate with the paired electronic device when prompted by the graphic display interface.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
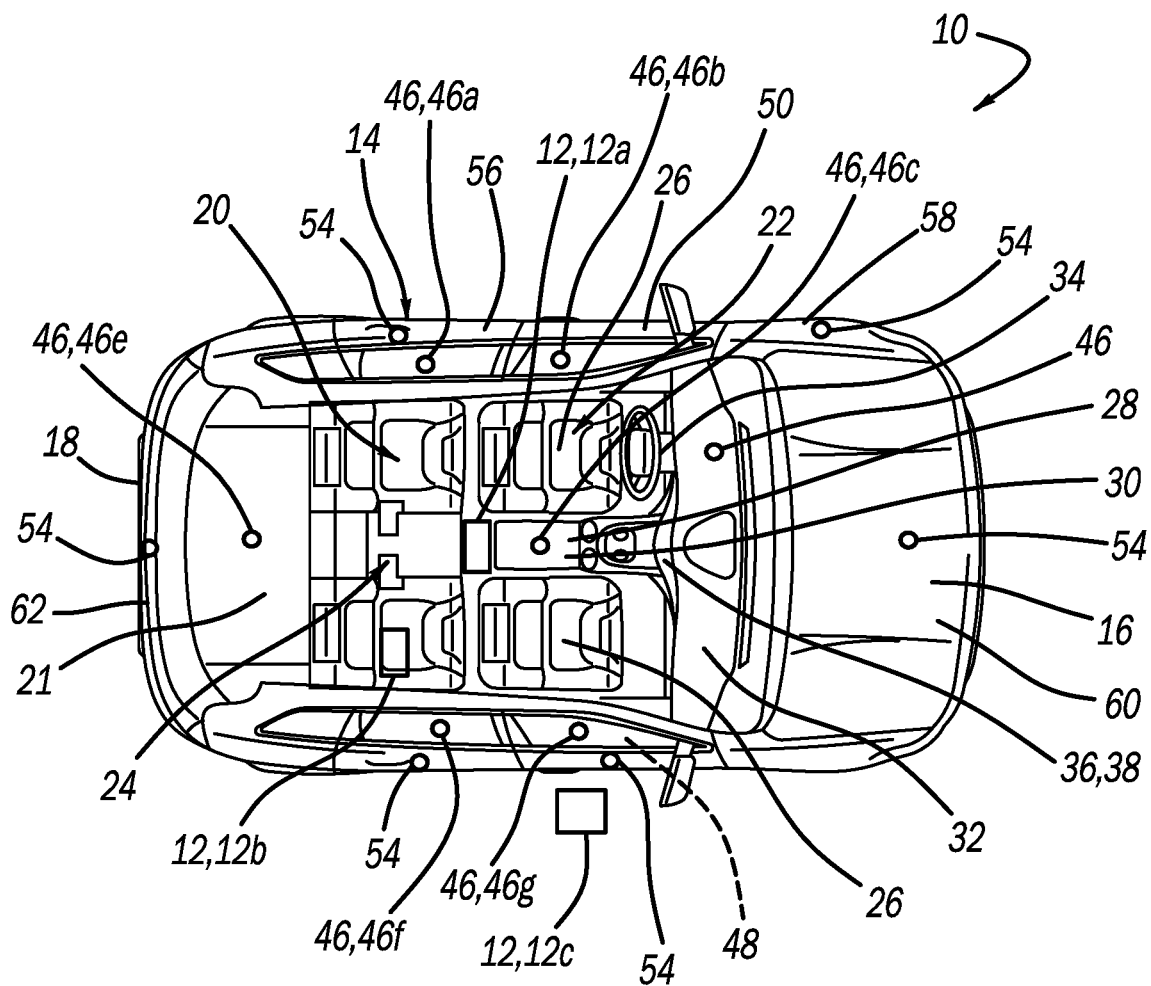
FIG. 1 is a perspective view of a vehicle according to a principle of the present disclosure.

FIG. 1 illustrates a vehicle 10 configured to locate a lost electronic device 12 according to a principle of the present disclosure. Vehicle 10 includes a vehicle body 14 having a front end 16 and a rear end 18. A cabin 20 is positioned between the front end 16 and the rear end 18. Cabin 20 includes a front seating area 22 and a rear seating area 24. Front seating area 22 includes a pair of front seats 26 separated by a storage compartment 28 that includes a movable cover 30 that may provide access to the storage compartment 28, and act as an arm rest for the vehicle's occupant(s). Vehicle 10 may also include a rear storage compartment 21 that is a trunk or bed. Although vehicle 10 is illustrated as having front seating area 22 and rear seating area 24, it should be understood that vehicle 10 may only include front seating area 22 or optionally include a third-row seating area without departing from the scope of the present disclosure. Moreover, other types of vehicles are contemplated including busses, boats, trains, airplanes, helicopters, utility vehicles, and the like.

Figure 2:
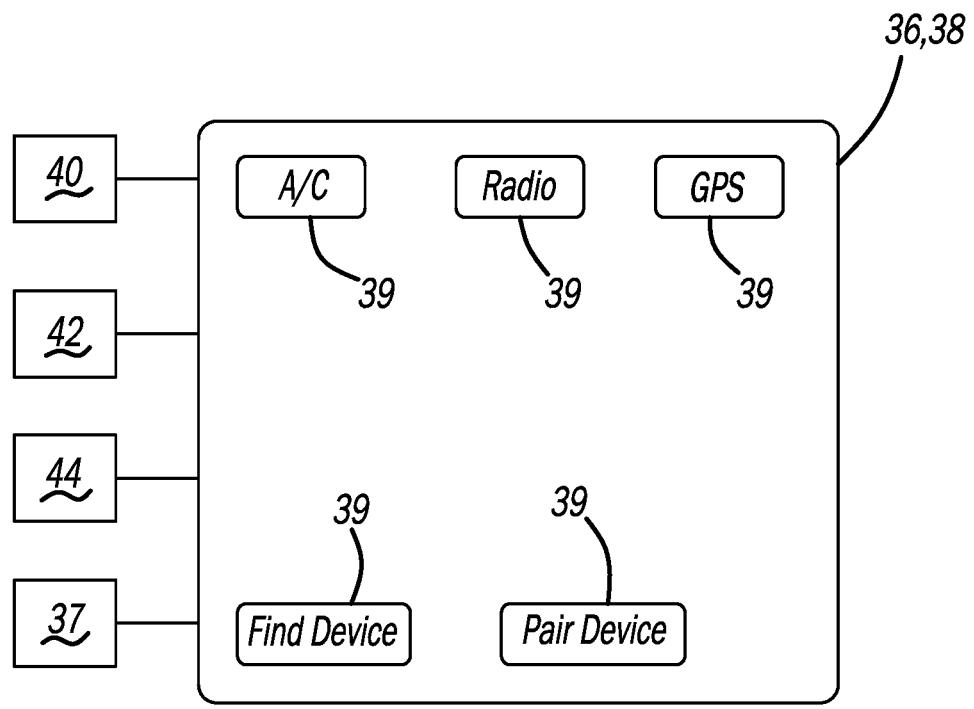
FIG. 2 is a schematic of an example graphic display interface according to a principle of the present disclosure.

Cabin 20 includes a dashboard 32 including a steering wheel 34 and graphic display interface 36. As best shown in FIG. 2, graphic display interface 36 includes a screen 38 that may be used to display various operating statuses of the vehicle 10, and may be used to control various features of the vehicle 10 including HVAC, radio, GPS, and the like. Screen 38 may be any type of display device known to one skilled in the art, which includes touch-screen displays. If screen 38 is a touch-screen display, each of the features such as HVAC, radio, GPS, and the like may be controlled by tapping the desired icon 39, as shown in FIG. 2. In addition, graphic display interface 36 may include various communication transmitters and receivers 40 and 42, respectively, that may connect and wirelessly communicate with electronic device 12 such as a mobile phone, tablet, personal digital assistant, computer, and the like.

Although transmitter 40 and receiver 42 are illustrated as separate structures in FIG. 2, it should be understood that a single structure may function as both the transmitter 40 and receiver 42 without departing from the scope of the present disclosure. In addition, it should be understood that these features may be separate and apart from graphic display interface 36, and be configured to communicate with graphic display interface 36 via a wired connection or wirelessly. Regardless, the wireless connection and communication between electronic device 12 and the vehicle 10 enables the occupants of the vehicle 10 to answer/make phone calls, play music stored on or streamed from the electronic device 12, answer/send text messages, conduct navigation, and the like once the electronic device 12 is paired with graphic display interface 36, which can be accomplished by selecting the appropriate icon 39 to pair the device 12 and ensuring that device 12 is set up to pair with vehicle 10 (e.g., wireless communication on device 12 such as Bluetooth is turned on).

It should be understood that after steps are taken to first pair the electronic device 12 with graphic display interface 36, electronic device 12 may be configured to automatically pair with graphic display interface 36 every time the electronic device 12 is located near vehicle 10 and the vehicle is turned on to activate graphic display interface 36. That is, after the initial pairing of electronic device 12 and graphic display interface 36 and removal of the device 12 from the vehicle 10 or turning the vehicle 10 off, the electronic device 12 does not necessarily require the user of the device 12 to take steps to again pair device 12 with graphic display interface 36. Rather, the device 12 may be configured to automatically again pair with the graphic display interface 36 so long as the vehicle 10 is turned on and the electronic device 12 is located proximate (i.e., within a specified distanced from vehicle 10) graphic display interface 36. It should also be understood that multiple electronic devices 12 may simultaneously be paired with graphic display interface 36.

This is significant because it is common for an occupant of the vehicle 10 to misplace electronic device 12 within cabin 20 while in the vehicle 10, or drop the electronic device 12 while entering or exiting cabin 20. In either of these events, according to a principle of the present disclosure, the occupant or owner of the electronic device 12 may utilize graphic display interface 36 to locate the misplaced electronic device 12 within the vehicle 10, or locate the misplaced electronic device 12 outside of the vehicle 10 provided that the misplaced electronic device 12 is within a predetermined distance from vehicle 10.

More particularly, vehicle 10 may include a plurality of interior antennas 46 located within cabin 20 of vehicle 10. Interior antennas 46 are configured to communicate with graphic display interface 36. Thus, when vehicle 10 is turned on and device 12 has been set up to automatically pair with graphic display interface 36, interior antennas 46 may also simultaneously communicate with the paired device 12. The interior antennas 46 may be located at various locations throughout cabin 20, without limitation. For example, interior antennas 46 may be attached to an inner panel 48 of vehicle door 50, or located in a cavity (not shown) of vehicle doors 50; within or on storage compartment 28; on dashboard 32; and behind rear seating area 24 (e.g., in storage compartment 21). Interior antennas 46 may communicate with each other via a wireless or wired connection, in addition to communicating with graphic display interface 36 and electronic device 12. Once the locations of interior antennas 46 has been determined, the locations thereof can be stored on an electronic control unit 44 of the vehicle 10 that communicates with graphic display interface 36, or stored in a memory 37 of graphic display interface 36 (FIG. 2). In addition, the distances that separate each interior antenna 46 may be stored in the ECU 44 or memory 37. Example antennas that may be used for interior antennas 46 include radio frequency (RF) antennas, Bluetooth antennas, and Bluetooth Low Energy antennas, and/or any other type of antenna known to one skilled in the art.

Vehicle 10 may also include a plurality of exterior antennas 54 located about an exterior of the vehicle 10. For example, exterior antennas 54 may be attached to an outer panel 56 of vehicle door 50, or located in a cavity (not shown) of vehicle doors 50; within or on wheel wells 58; on a hood 60 or within an engine compartment (not illustrated) underneath hood 60; and on exterior panels 62 that define storage compartment 21, or within storage compartment 21. Exterior antennas 54 may communicate with each other and interior antennas 46 via a wireless or wired connection, in addition to communicating with graphic display interface 36 and electronic device 12. Once the locations of exterior antennas 54 has been determined, the locations thereof can be stored in ECU 44 of the vehicle 10 that communicates with graphic display interface 36, or stored in a memory 37 of graphic display interface 36. In addition, the distances that separate each exterior antenna 54, and the distances that separate each of the exterior antennas 54 from each of the interior antennas 46, may be stored in the ECU 44 or memory 37. Example antennas that may be used for exterior antennas 54 include radio frequency (RF) antennas, Bluetooth (BT) antennas, and Bluetooth Low Energy (BTLE) antennas, and/or any other type of antenna known to one skilled in the art.

As noted above, when electronic device 12 is paired with graphic display interface 36, electronic device 12 may be simultaneously communicating with interior antennas 46 and/or exterior antennas 54, which are also communicating with graphic display interface 36. If the electronic device 12 is misplaced in cabin 20, the communication between electronic device 12 and at least one of interior antennas 46 and/or exterior antennas 54 can be used to locate electronic device 12. In this regard, an occupant of the vehicle 10 can interact with graphic display interface 36, which is configured to display a probable location of the device 12 in cabin 20 based on the communication between device 12, antennas 46 and/or 54, and graphic display interface 36.

Figure 3:
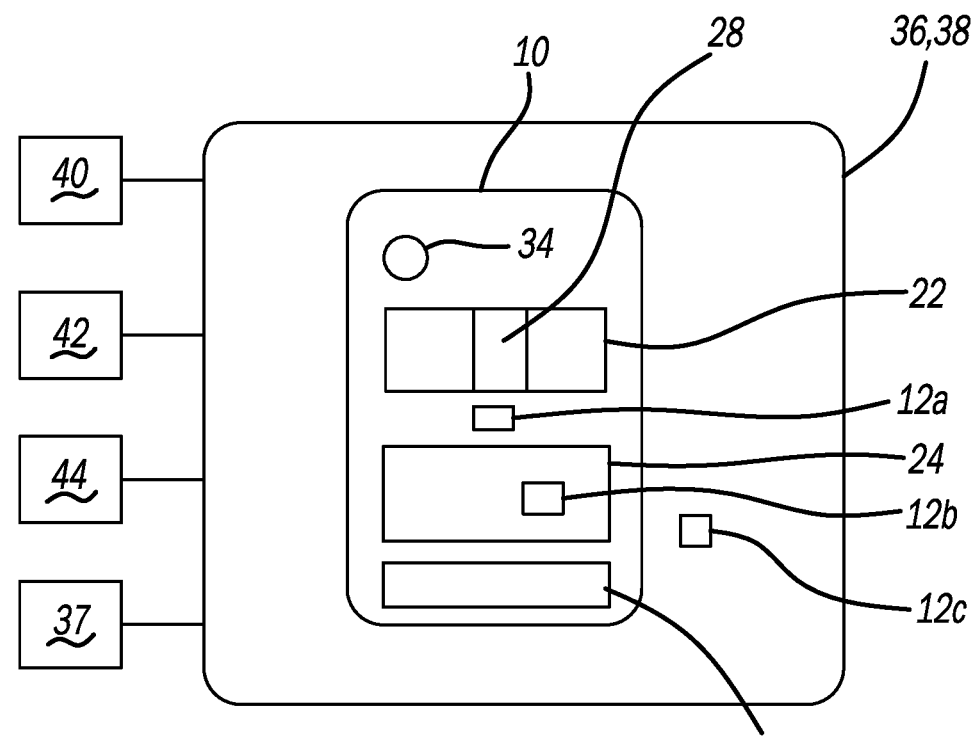
FIG. 3 is another view of the graphic display interface illustrated in FIG. 2, when prompted to locate an electronic device according to the present disclosure.

For example, if an electronic device 12a happens to fall between front seating area 22 and rear seating area 24, at least one of the interior antennas 46 and/or exterior antennas 54 may communicate with electronic device 12a. Preferably, antennas 46a, 46b, and 46c located at doors 50 and storage compartment 28 will be communicating with electronic device 12a. Based on this communication, the probable location of electronic device 12a within cabin 20 can be determined. Specifically, based on this communication, a controller (e.g., ECU 44) of graphic display interface 36 can calculate the location utilizing the predetermined locations of the antennas 46a, 46b, and 46c, their distances away from each other, and the distances between electronic device 12a and the interior antennas 46a, 46b, and 46c. The distance between each of the interior antennas 46a, 46b, and 46c and the electronic device 12a can be determined based on, for example, a signal strength of the communication between these components (if antennas 46, 54 are RF antennas) or a time of flight (if antennas 46, 54 are BT or BTLE antennas). The phrase "time of flight" is indicative of an amount of time that the elapses between when an antenna 46, 54 emits a signal and a response signal is received by the device 12. Using this information, the probable location can be determined (e.g., by triangulation), and then displayed on the display 38 of graphic display interface 36 (FIG. 3). It should be understood that while the use of multiple antennas 46 and/or 54 to locate device 12a is preferred, only a single antenna 46, 54 is necessary to communicate with device 12a in order to determine a probable location of device 12a.

In another example, an electronic device 12b may be misplaced on the seats of rear seating area 24. In such an instance, the interior antennas 46c, 46e, 46f, and 46g preferably communicate with electronic device 12b, although only a single antenna 46 or 54 is needed. Again, using information such as the location of these antennas, their distance away from each other, the signal strength or time of flight between these antennas and the electronic device 12b, the probable location of device 12b can be determined, and then displayed on the display of graphic display interface 36. It should be understood, that not just the misplaced device 12b can be displayed, but rather the location of each device 12 that is paired with graphic display interface 36 can be simultaneously displayed. Alternatively, a list of devices 12 that are paired with interface 36 can first be displayed, and an occupant of the vehicle 10 can select one of the devices from the list for its location in cabin 20 to be displayed by interface 36. To instruct the interface 36 to display the location of a paired device 12, the interface 36 may include an icon or button 39 (FIG. 2) that can be pressed or tapped to initiate communication between the paired device 12 and the antennas 46 to locate the paired device 12, and then display its location on interface 36. It should be understood, however, that communication between device 12 and antennas 46 does not need to be initiated, but can occur any time that device 12 is paired with interface 36.

Similarly, if device 12c is misplaced outside of vehicle 10, the exterior antennas 54 and/or the interior antennas 46 can be used in the same manner to locate the misplaced device. This can only occur if device 12c is located within a distance sufficient to permit communication between device 12c and antennas 46 and/or 54, and interface 36. An example distance can be up to 25 feet. The distance, however, can be increased or decreased dependent on the types of antennas or receiver/transmitter used. In this manner, the location of a misplaced device 12 can be determined without the owner of the misplaced device 12 having to access a third party application, or using a separate device to locate the device 12.

Figure 4:
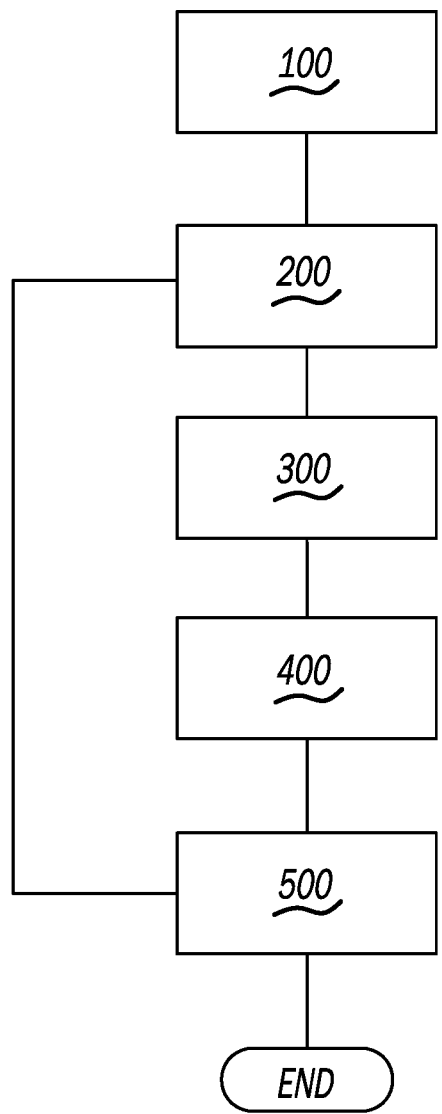
FIG. 4 is a flow chart illustrating a method of locating a misplaced electronic device according to a principle of the present disclosure.

In summary, referring to FIG. 4 of the application, an occupant of vehicle 10 that has misplaced an electronic device 12 may locate the electronic device 12 so long as the electronic device 12 has been paired to vehicle 10, and electronic device 12 has sufficient energy (e.g., battery) that permits communication between the electronic device 12 and the vehicle. First, at block 100, the occupant must initiate the "find device" feature of graphic display interface 36 by tapping the appropriate icon 39 or button. If multiple devices 12 are connected to vehicle 10, the occupant may select the desired device(s) 12 to be located by selecting the desired device(s) 12 from a list of devices 12 that are paired to vehicle 10 (block 200). At block 300, interface 36 (or ECU 44 or memory 37) instructs the antennas 46 and 54 to detect the desired device(s) 12. Then, at block 400, after device(s) 12 are located using antennas 46 and 54, screen 38 of interface 36 may display the vehicle 10 and the location of the device(s) in or around vehicle 10 (see, e.g., FIG. 3). Once the misplaced device(s) 12 are located, the occupant may then search for another device 12, or end the "find device" feature of interface 36 (block 500).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a vehicle body including an exterior, and including an interior cabin;
a graphic display interface positioned within the interior cabin, the graphic display interface configured to be paired to a portable electronic device; and
a plurality of antennas located on the exterior of the vehicle body, within the interior cabin, or located on the exterior of the vehicle body and within the interior cabin,
wherein the plurality of antennas are each configured to communicate with at least the graphic display interface and the portable electronic device when the portable electronic device is paired with the graphic display interface,
communication between the paired portable electronic device and at least one of the plurality of antennas determines a location of the paired portable electronic device either near the exterior of the vehicle or within the interior cabin, and
wherein the graphic display interface is configured to display the location of the paired portable electronic device when lost within the interior cabin or lost near the exterior of the vehicle based on the communication between the paired portable electronic device and the at least one of the plurality of antennas.

2. The vehicle of claim 1, wherein the graphic display interface includes at least one of a controller and memory for storing data associated with locations of each of the antennas and distances between each of the antennas.

3. The vehicle of claim 2, wherein the graphic display interface includes the controller, and the controller is configured to determine the location of the portable electronic device based on a combination of the data and the communication between the paired portable electronic device and the at least one of the plurality of antennas.

4. The vehicle of claim 3, wherein a distance between the portable electronic device and each of the antennas is based on a signal strength or time of flight of the communication between the portable electronic device and each of the antennas.

5. The vehicle of claim 4, wherein the distances between each of the antennas and the portable electronic device is used by the controller to determine the location of the portable electronic device.

6. The vehicle according to claim 1, wherein the exterior of the vehicle includes vehicle doors, a hood, wheel wells, and a rear storage compartment, and the antennas located on the exterior of the vehicle are located on at least one of these components.

7. The vehicle according to claim 1, wherein the interior cabin includes a front seating area, a rear seating area, and a storage compartment between seats of the front seat area, and the antennas located within the interior cabin are located proximate each of these components.

8. The vehicle according to claim 1, wherein each of the antennas are configured to communicate with the paired electronic device when prompted by the graphic display interface.

9. A method for locating a lost portable electronic device that is paired with a vehicle, comprising:
using a plurality of antennas located on an exterior of a body of the vehicle, within an interior cabin of the vehicle, or located on the exterior of the body and within the interior cabin of the vehicle to communicate with the lost portable electronic device; and
displaying a location of the lost portable electronic device within or near the vehicle based on the communication between the plurality of antennas and the portable electronic device on a graphic display interface of the vehicle.

10. The method of claim 9, wherein the graphic display interface includes at least one of a controller and memory for storing data associated with locations of each of the antennas and distances between each of the antennas.

11. The method of claim 10, wherein the graphic display interface includes the controller, and the controller is configured to determine the location of the lost portable electronic device based on a combination of the data and the communication between the lost portable electronic device and at least one of the plurality of antennas.

12. The method of claim 11, wherein a distance between the lost portable electronic device and each of the antennas is based on a signal strength or time of flight of the communication between the lost portable electronic device and each of the antennas.

13. The method of claim 12, wherein the distances between each of the antennas and the lost portable electronic device is used by the controller to determine the location of the lost portable electronic device.

14. The method according to claim 9, wherein the exterior of the vehicle includes vehicle doors, a hood, wheel wells, and a rear storage compartment, and the antennas located on the exterior of the vehicle are located on at least one of these components.

15. The method according to claim 9, wherein the interior cabin includes a front seating area, a rear seating area, and a storage compartment between seats of the front seat area, and the antennas located within the interior cabin are located proximate each of these components.

16. The method according to claim 9, wherein each of the antennas are configured to communicate with the lost paired electronic device when prompted by the graphic display interface.

\* \* \* \* \*